Dec. 16, 1941.  A. H. REEVES  2,266,401
SIGNALING SYSTEM
Filed June 9, 1938  11 Sheets-Sheet 1
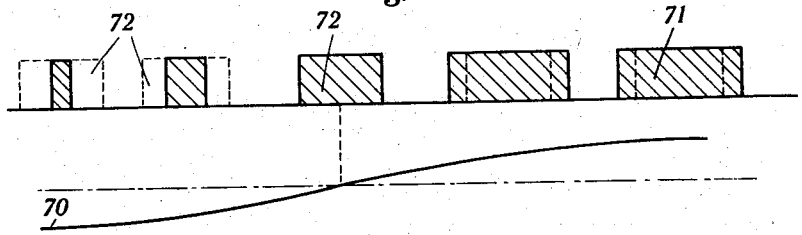
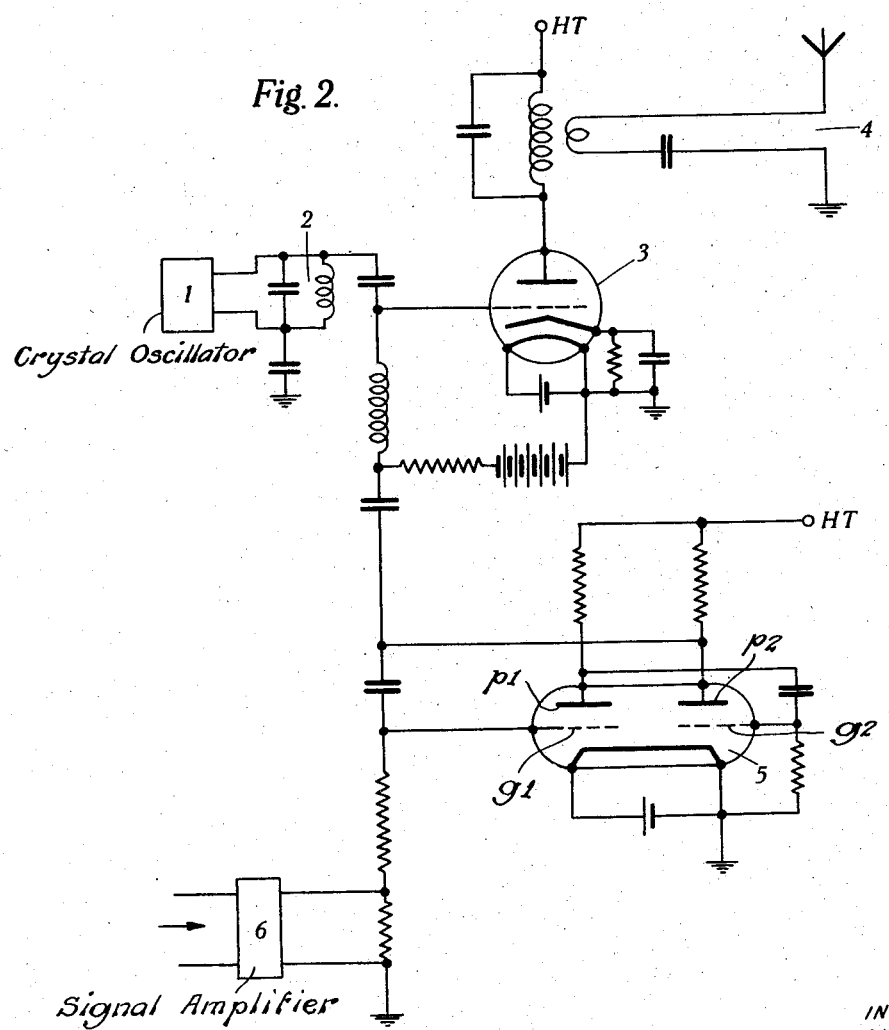
INVENTOR
A.H. REEVES
BY
ATTORNEY Dec. 16, 1941.  A. H. REEVES  2,266,401
SIGNALING SYSTEM
Filed June 9, 1938   11 Sheets-Sheet 10

INVENTOR
A.H. REEVES
BY
ATTORNEY

Patented Dec. 16, 1941

2,266,401

UNITED STATES PATENT OFFICE 2,266,401

SIGNALING SYSTEM

Alec Harley Reeves, Paris, France, assignor to International Standard Electric Corporation, New York, N. Y.

Application June 9, 1938, Serial No. 212,731
In France June 18, 1937

6 Claims. (Cl. 250—17)

The present invention relates to improvements in signaling systems, particularly for the transmission of messages, for example, telephone or telegraph messages.

In telephony and many other cases the control signals which it is desired to transmit are characterised by a variation of the amplitude of a carrier current as a function of the time.

One characteristic of the present invention is the replacement of the variable amplitude by another variable also function of the time.

The system of signaling by time pulses according to the present invention provides means for obtaining a practically perfect transmission in telephony, television etc., when signal-noise ratio is not very high.

In accordance with one aspect of the invention means are provided for transmitting pulses of rectangular wave form at a constant frequency higher than the highest frequency entering into the composition of the signal to be transmitted.

In order to impart the characteristic form of the signal to be transmitted means are provided permitting the width of these pulses of rectangular wave form to be varied so that their width is a function of the instantaneous amplitude of the wave constituting the signal at the moment when the pulse under consideration is transmitted.

In accordance with another aspect of the invention instead of transmitting pulses of a certain duration means are provided whereby sharp pulses are sent for the purpose of delineating the times of the beginnings and ends of the rectangular signals, i. e. to transmit two sharp pulses in place of each of the latter.

The amplitude of the pulses transmitted may or may not be maintained at a constant level since it is sufficient for the receiver to be capable of distinguishing the pulses or the sudden sharp signals determining the origin and end of this pulse.

The pulses of a certain duration, or the sharp signals determining the origin and the end of this pulse may be characterised by variations of amplitude, of phase, of frequency, of polarisation, or direction of transmission or any other change in the nature of the waves constituting the signal to be transmitted, and which the receiver is capable of distinguishing.

In accordance with another aspect of the invention the transmission system described above is employed in relation to a receiver with limited selectivity and which remains insensitive to the waves received having an amplitude lower than a certain value during the interval between the pulses.

Provided that the fundamental noise always has an amplitude lower than that of the pulses of the signal which it is desired to receive, this interference will remain without effect on the receiver except during the very short periods of transition during which the receiver changes its balance position, passing from the normal position to the operative position, or vice versa, these terms being employed by analogy with the operation of a telephone system.

The sound energy capable of effecting the operation of the receiver is thus far weaker than in the normal case of the receiver which is constantly sensitive to interferences.

Moreover, since the influence of the fundamental noise is confined to the periods of transition, the only possible effect of this fundamental noise is slightly to change the exact moment at which the passage from the normal position to the operative position is established. As the period of transition is of short duration compared with that of the pulse, the slight modulation corresponding to the above effect in the time in which the passage from one position to the other is established, can have no other effect than a very slight distortion of the shape of the wave of the signal.

In one system of the invention which for convenience may be called "double pulse system," the mean power dissipated in the last tube of the transmitting station is very weak with respect to the maximum instantaneous power transmitted. This results in a very low energy consumption for a given result in a receiver; this feature also provides the possibility of employing valves of relatively low power, since the factor which also limits the power which can be obtained from the valves is the mean energy dissipated rather than the maximum instantaneous power. The advantage of this feature may be still further increased by employing valves having a higher emission than the usual values by the use of a stout filament having a high reserve of emission.

The above pulses of variable duration will be employed to modulate a carrier current of a higher frequency than that of the pulses, or may be used to constitute the transmitted wave without any modulation.

The various characteristics of the invention will be more easily understood from a reference to the following description and the attached drawings.

Fig. 1 represents the wave form of a signal, and the wave form of the corresponding simple pulses.

Fig. 2 represents an embodiment of a simple pulse transmitter system.

Figure 3:
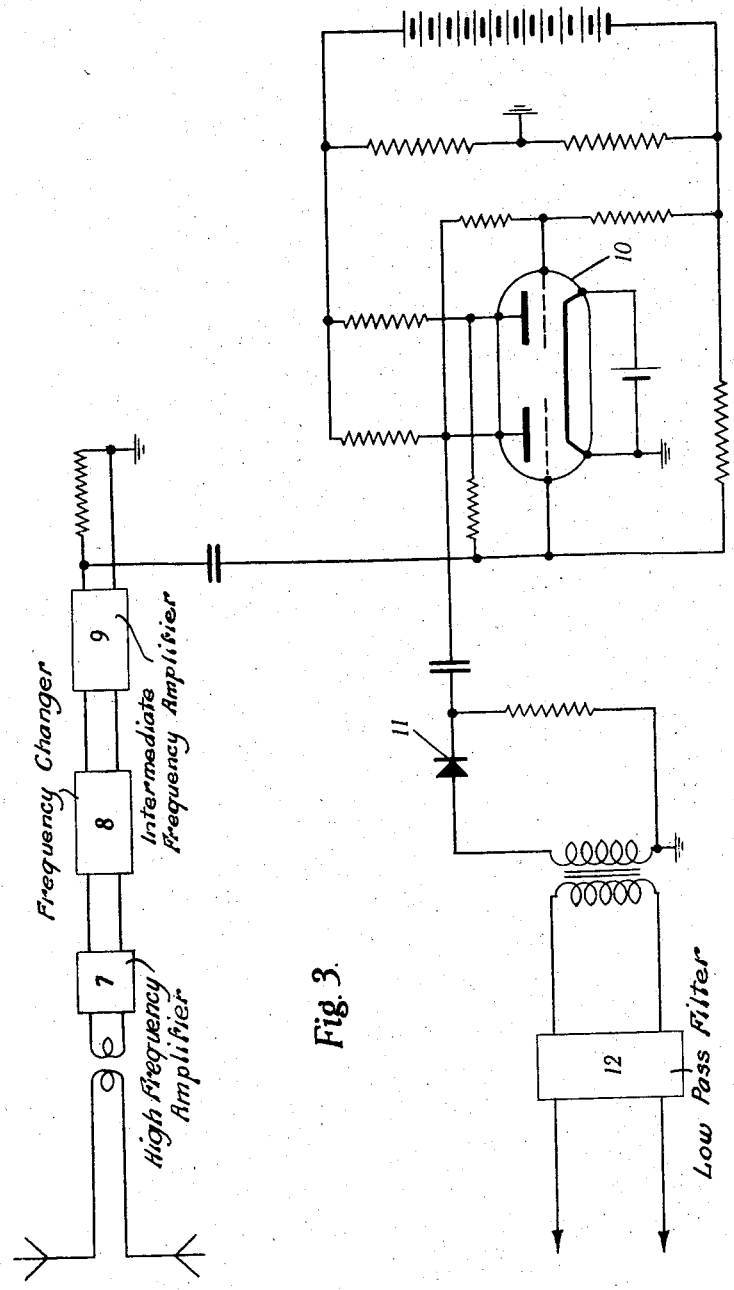
Fig. 3 represents an embodiment of a simple pulse receiver system.

Fig. 1 represents an example of the wave form of the system of modulation by simple pulses, the modulator current 70 is represented in the lower portion and the pulses 71 obtained in accordance with characteristics of the invention in the upper portion; it can be seen that the duration of the pulses transmitted varies according to the amplitude of the signal, the duration of the pulses being minimum when the current constituting the signal is minimum (i. e. when such current is of negative sign and of maximum absolute value) and the duration of the pulses being maximum when the current constituting the signal is positive and of maximum amplitude.

In other words, the modulation is done in such a way that the amplitude remains constant and the width of each rectangular pulse is in practically linear relation with the amplitude of the current constituting the signal at this moment. In the absence of modulation the pulses would take the wave form shown in dotted lines in 72.

In order to render the operative advantages of the system clearer we will consider its application in the case of a radio telephone link operating in the range of ultra-short waves.

Assume for the moment a single-channel link working on 75 megacycles and within the optical range. If such a link is suitably designed, it is (in general) fairly easy to obtain by normal means a signal/noise ratio of about 30 db. with a very small and inexpensive transmitter—one having a carrier power of ¼ watt, or less. But if the link forms part of a main trunk telephone network, the signal/noise ratio must be at least 20 db. better than this; and a figure of 60 db. will almost certainly have to be met in the near future. To do this in the case assumed, a carrier power of 250 watts would be required; and, apart from this, special precautions would have to be taken to eliminate "mains" noise, and other interferences of an "artificial" nature. The equipment, then, would have to be much larger and more expensive than the simple ¼ watt apparatus first considered.

The application of the "pulse modulation" principle to improve the 30 db. ratio given by the above small transmitter will now be dealt with. The high frequency carrier at the transmitter is first modulated by a substantially rectangular wave at a frequency of about 15 kc.; the width of the peaks of this wave is then modulated by the speech as shown in Fig. 1, the amplitude remaining constant.

The high frequency and intermediate frequency (if any) circuits of the transmitter and receiver have sufficiently wide bandwidths to pass those harmonics necessary to preserve substantial rectangularity of the transmitter output wave-form; i. e. to pass a band of about 200 kc. (At 75 mc. carrier, this problem presents no difficulties; neither, in general, does the fact that 200 kc. ether space is required.) At the receiver sufficient high frequency or intermediate frequency gain is used so that the rectangular wave has a voltage (2 to 3 volts in most cases) sufficient to operate some form of valve "trigger" device—a "trigger" of the type that returns to its initial electrical position automatically on the cessation of the "trigging" impulse. (One form of such a device is described below.)

With the original signal/noise ratio of 30 db., the noise voltage will, however, almost always be unable to operate this trigger valve. (This applies in all cases, in fact, where the ratio is at least about 10 db.) At the output of the trigger, then, will appear a wave-form modulated pulse which is an exact reproduction of that at the transmitter. The pulse is then applied to any usual form of demodulator, and the pulse frequency—higher than any of the desired audio components—filtered out. After this filtering, the audio voltage at any moment will be proportional to the average area of the pulses at that instant above the zero line. (See Fig. 1.) The audio output, then, will be an exact reproduction of the original speech.

Let us now consider the action of the background noise voltage. We have already seen that during the pulse "spaces" the noise can have no effect on the trigger valve. During the "marking" positions of the pulses, further, when the trigger has settled down to its final steady value, the noise will also have no effect. The trigger is simply a 2-position switch; it is either "on" or "off." When in either of these positions, no disturbance will have any effect as long as that disturbance is not strong enough to switch over the trigger. The only possible effect of a noise pulse (except those of quite second orders of magnitude, which we shall neglect) will occur during the switching process, and not when either the "on" or the "off" position has once been attained. Owing to the time-constants of the circuits, it is impossible in practice to make the waveform of the pulses applied to the trigger exactly rectangular; there must always be a small finite time during the "building up" and "dying away" processes, the length of this transitional period varying inversely with the over-all band width of the transmitter-receiver system. During the building up, if a noise impulse of "positive" sign arrives just before trigging would normally take place, this impulse will accelerate the rise of voltage, thus speeding up slightly the moment of trigging. Similarly, a noise pulse of "negative" sign arriving during the dying away period, and just before the reverse trigging, will slightly advance the instant at which this "restoring trigging" takes place. In either case, a slight audio voltage, at the apparatus output, will result from the noise impulse.

The noise pulses, however, can only produce modulation of the trigger output—and therefore an audio disturbance—when they arrive during the threshold periods just before trigging in either direction.

The steeper the wave-front of the signal pulses applied to the trigger—i. e. the more rectangular the wave-form—the shorter will be the duration of these transition periods. (In the limiting case, for exact rectangularity, the duration times will be zero.) Hence, the more rectangular the wave-form, the less will be the disturbing effect of the background noise.

Taking the above practical case of a wave-form corresponding to a band width of 200 kc., calculation shows that a substantial reduction of noise will be obtained, as compared with the usual "amplitude modulation" system.

The use of a trigger circuit in the receiver, although in most cases preferable, is by no means essential to the invention. One alternative is to use, instead of a trigger, an amplifier tube biased beyond cut-off, in conjunction with a limiting device. With this arrangement, the "cut-off" feature prevents disturbing action of the noise pulses during the "spacing"; and the action of the limiter cuts out the noise during "marking."

It is clear that either a trigger or a limiter will also prevent any fading from affecting the audio output as long as this fading is not so great that it stops the correct action of these devices.

As long as this fading does not make the signal/noise ratio less than about 10 db.—which is also the limiting condition for correct reduction of "natural" static—the "pulse modulation" system will give the same improvement in signal/noise ratio, as compared with the normal amplitude modulation system, as dealt with above. As before, the greater the band-width passed, the greater the improvement—as long as this band-width is not so great as to permit the peak values of the integrated noise throughout the band to exceed about ⅓ of the voltage of the signal pulses.

One form of transmitter suitable to meet the requirements of a radio-telephone link is shown in Fig. 2. A crystal oscillator 1 operating at a frequency of 18.75 mc. has an output circuit 2 tuned to the second harmonic 37.5 mc. The output of 2 is then doubled in frequency by the tube 3, the plate circuit of which feeds into the antenna at 75 mc. The output of 3 is 100% modulated in amplitude by applying to its grid the output of the multi-vibrator 5, which is arranged to supply a substantialy rectangular wave-form at 15 kc. The incoming speech is amplified by the tube 6, and then applied to grid g1 of the two grids g1, g2 of the multi-vibrator double triode 5.

The effect of this speech modulation on grid g1 of 5 (with suitable adjustment) is to modulate the width of the rectangular pulses given in the output of plate p2, without appreciably affecting their amplitude. The result in the antenna will be a carrier, pulse modulated at 75 mc. with the desired wave-form as described above. The transmitter requires 4 tubes in all. They may be all of the small "receiving" type. 3 is preferably of a type especially designed for ultra-short wave working. 5 is any standard form of small double triode.

One form of receiving circuit suitable for the above link is shown in Fig. 3. 7 is a high frequency amplifier; 8 a frequency changer, and 9 an intermediate frequency amplifier; all three of these units being of the usual forms suitable for a superheterodyne receiver operating at 75 mc. The units are designed to pass a band width of about 200 kc. and the intermediate frequency amplifier is arranged to give about 3 volts output from the "marking" pulses during conditions of minimum signal. This output from 9 is then applied to the input of the trigger circuit 10. The trigger is a double-stability circuit of known type, with the additional feature that the resistances are so adjusted that, in the absence of "signal", the circuit is unbalanced sufficiently to cause it to be stable in one position only. The sign of the marking pulses from 9 when applied is such as to cause the trigger to "jump" from its initial equilibrium position to its second position. Owing to the unbalance, therefore, on the cessation of the marking pulses the trigger will return to position No. 1. The natural time-constants of the trigger are adjusted to be appreciably less than the "transition periods" of the applied pulses. The output wave-form from the trigger will thus be an almost exact reproduction of the pulse wave-forms.

The trigger adjustment, further, is such that the peak noise voltage cannot operate it.

The output from 10 is then demodulated in 11 and the pulse frequencies removed by the low-pass filter 12. The resulting output from 12 will give a correct reproduction of the original speech at the transmitter.

In the system in accordance with the foregoing characteristics of the invention, and particularly with the device employing a trigger circuit only the beginning and end of each impulse plays an essential part in the signal reception. In accordance with another feature of the invention the receiver circuit is set up so as to have two stable positions, that is to say, it comprises a circuit going from one stable position to another stable position upon the reception of the pulse and remaining indefinitely on this position until it receives a second pulse which restores it to its first position. An embodiment of this means of this invention would, for example, be a circuit in which identical pulses were employed for the release and restoration to normal of a circuit of the type with double stability usually known as a frequency divider.

Figure 4:
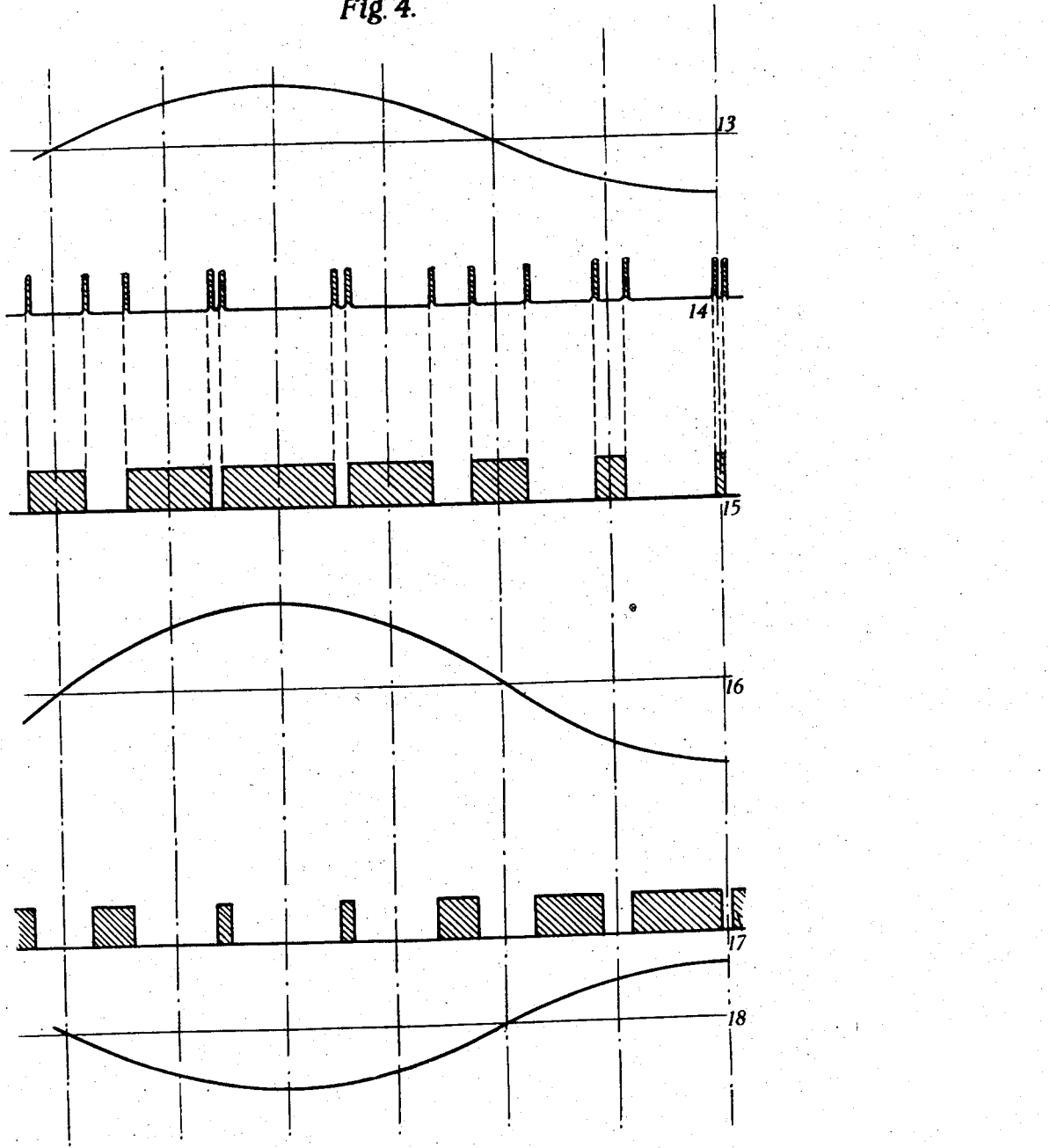
Fig. 4 represents the wave form of a signal and the wave form of corresponding double pulses and the output current of a receiver in normal receiving position and in displaced position.

The use of this feature of the invention permits the attainment by the use of very short pulses such as shown in Figure 4, of exactly the same results which can be obtained by the transmission of the pulses of rectangular form of the type previously explained, such rectangular pulses being employed with a system which returns automatically to the normal position as soon as the control potential ceases to be applied to it. In Fig. 4 the curve 13 represents the signal applied to the transmitter, for example a telephone current, and the curve 14 the pulses transmitted, comprising a pulse for the beginning and one for the end of the rectangular pulses corresponding to the characteristic previously explained of the invention and shown at 15. By means of this feature of the invention it is possible to effect a great saving in the energy necessary, as well as in the cost of the installation for equivalent results in the receiver. In effect, the mean power emitted by the transmitter remains very weak with respect to the maximum momentary power. The factor limiting the power which can be obtained from a tube is, relatively speaking, its heating, and the latter being in proportion to the efficient power dissipated inside the tube, the pulses of the type represented at 14 on the Figure 4, although of a considerable momentary power, only produce a slight heating because they have a very low mean efficient value.

The fact that only very short pulses are required, immediately leads to the possibility of dispensing altogether with the usual master oscillator in conjunction with one or more high-vacuum tubes as amplifiers and/or modulators, and a return instead, to the principle of the spark transmitter. As, for telephony, the pulses must recur at a periodicity of at least 10,000 per sec., the use of an actual spark would almost certainly be out of the question; but a gas-filled tube of the "thyratron" type could be designed, quite easily, to carry out this function. In order to obtain reasonable efficiency from a shock excited high-frequency transmitter, it is necessary for the steepness of wave-front of the exciter—the spark-gap for example—(measured in volts rise per second)—to be of the same order as that of the high frequency wave at its steepest portion produced in the oscillatory circuit that is excited. In a "thyratron," the steepness of the flash-over discharge is, of course, limited by the ionisation time-constant of the gas;—but this is also the case in a spark-gap. The same efficiency can therefore be obtained from a suitably designed "thyratron" as is now obtained from a spark gap; i. e. 40% or more. It is thus possible to effect a considerable saving in equipment size, and first cost,—particularly in the case of ultra-short wave transmitters of the higher powers that are used in broadcasting and television. For example, a mercury vapour tube capable of giving a high-frequency peak power of 100 kw. in the output, due to the flash-over, would be a comparatively small and cheap component; and using the present "double pulse" method of modulation, this figure of 100 kw., although only produced at the peaks, would result in a considerably greater signal/noise ratio at the receiver than is now obtained from a carrier power of 100 kw. by the usual "amplitude" modulation method. Thus a very considerable improvement over the conventional system would be obtained.

The above shock-excited type of "double pulse modulation" system would probably only prove economical when comparatively high powered transmitters are required;—because of an extra complication that would be necessary. This is due to the fact that some means is (in general) required to stabilise the frequency—as otherwise the high degree of frequency stability that is now obtained from crystal circuits would be lost. One such stabilising means is the addition of a high-vacuum tube to supply a variable amount of power, at the high frequency, into the shock-excited oscillatory circuit, approximately in quadrature with the oscillations excited by the "thyratron" into the latter. The drive on the high-vacuum tube being obtained from the "shock" oscillations themselves, the result is a control of the frequency of the "shock" oscillations according to the amount of power fed back in quadrature.

In order to obtain a control of the order of $\pm \frac{1}{2}\%$ in frequency—ample to cover possible accidental changes—the high-vacuum tube would have to have an instantaneous peak power of 2 or 3 kw. only; i. e. a tube of about 500 watts dissipation would be sufficient.

To effect the frequency control, beats could be obtained at very low power (1 watt, or less) between the output at the antenna and a crystal oscillator adjusted to the correct carrier frequency. The resulting beat note at 100 kc., for example, when the antenna frequency is correct—could then be applied to the "steep" portions of two resonance curves sloping in opposite directions, and connected to the grids of two rectifiers of which the plate circuits are in opposition. If this is carried out, the resulting plate current from the differential detector is proportional to the frequency at the antenna—being zero when the latter is correct. The application of this plate current to control the amount of power fed back by the high-vacuum tube gives, therefore, an automatic control of the frequency of the main transmitter circuit.

In order to automatically eliminate microphonic changes in frequency—due to vibration (mechanical and acoustic)—as well as stabilising the average frequency—it is only necessary to reduce the time-constant of the automatic control to a value of $\frac{1}{10}$ milli-sec., or slightly less.

Figure 5:
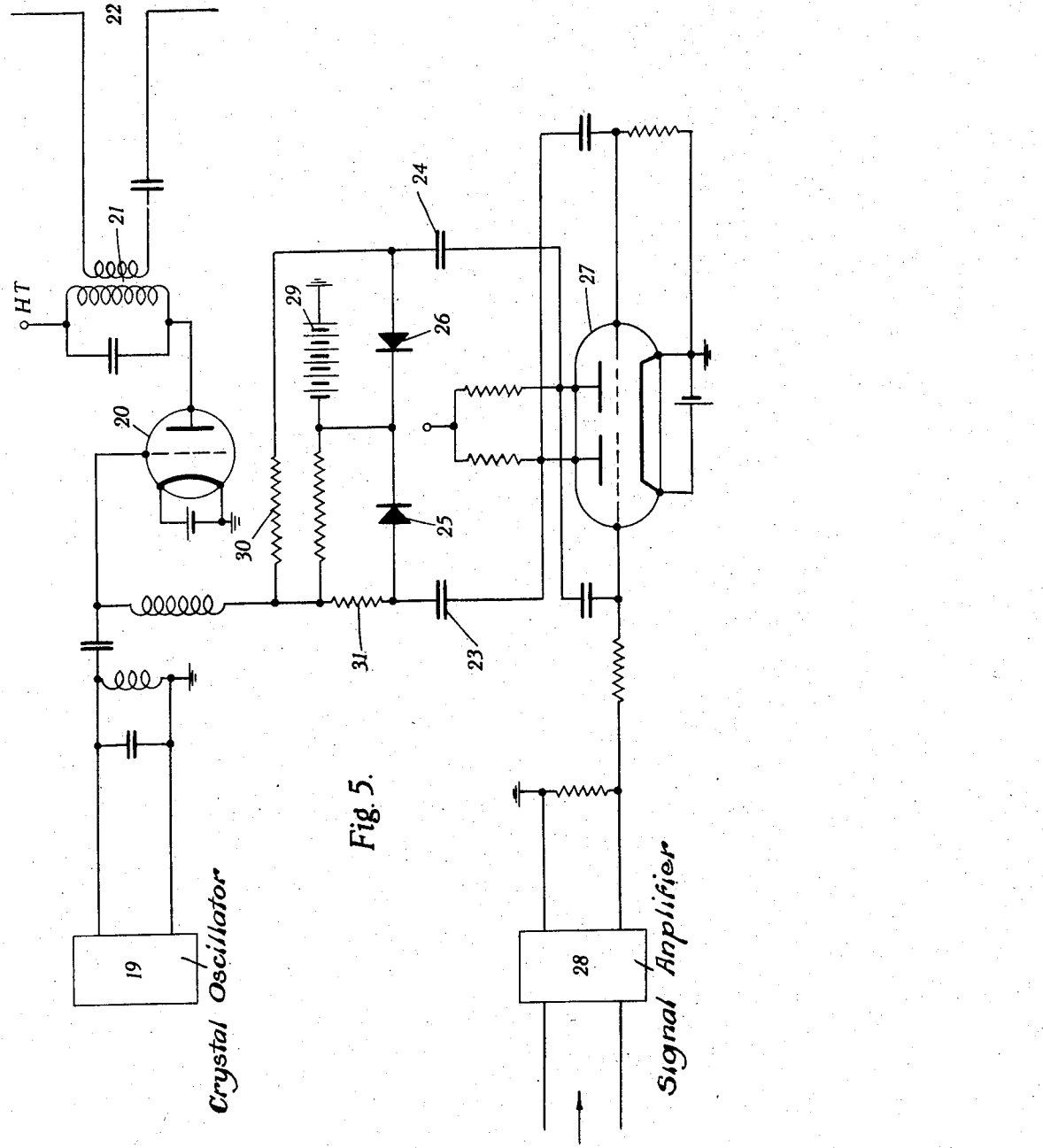
Fig. 5 shows an embodiment of a valve transmitter system with double pulse of low power.

One form of double-pulse transmitter is shown in Fig. 5; the only difference between this and the circuit of Fig. 2 is the addition of the small condensers 23 and 24, resistances 30 and 31 and the oxide rectifiers 25 and 26. 23 and 24 are of such value that the higher harmonics only, of the original rectangular pulses, are passed to the grid of the H. F. doubler-modulator 20.

Figure 6:
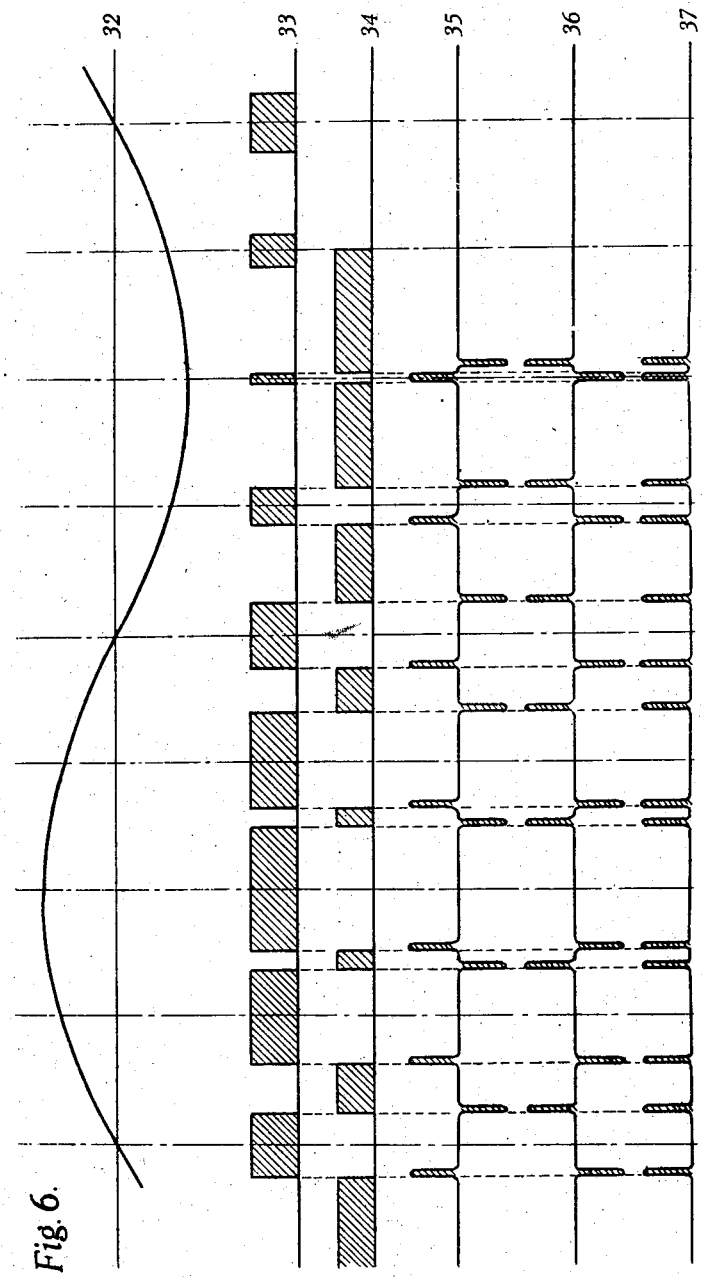
Fig. 6 shows the wave forms of the signals in the various circuits of a double pulse transmitter.

The curves of Fig. 6 explain the action of the circuit. Curve 32 represents the original "signal" wave. In 33 is shown the current wave-form in one of the plate circuits of the multi-vibrator 27.

Curve 35 shows the wave-form of the pulses produced by 33 after passing through the condenser 23, but before the action of the rectifier 25. 23 is of such a value that only the steep part of the wave is passed.

Curve 34 shows the current wave-form in the second plate circuit of 27. It is, of course, exactly out of phase with the current in the first plate.

In 36 is shown the pulses produced by the wave-form 34 after passing through condenser 24,—again, before the action of rectifier 26.

Curve 37 shows the resultant voltage wave-form on the grid of 20, due to the combined action of the two plate currents of the multi-vibrator,—in this case, after the action of the rectifiers has taken place. The rectifiers short-circuit to ground all the negative pulses, leaving only the combined positive pulses due to both plates of the tube 27. It is of the correct wave-shape required for transmission; it is of the same form as shown in curve 14 of Fig. 4.

The complete transmitter requires only 4 valves—as in the case of the "single pulse" system shown in Fig. 2. As already explained, however, the power consumption is considerably less than the latter; and the signal/noise ratio is higher,—as the output tube 20 can now be run at a higher level of peak high frequency for the same internal heat dissipated.

Figure 7:
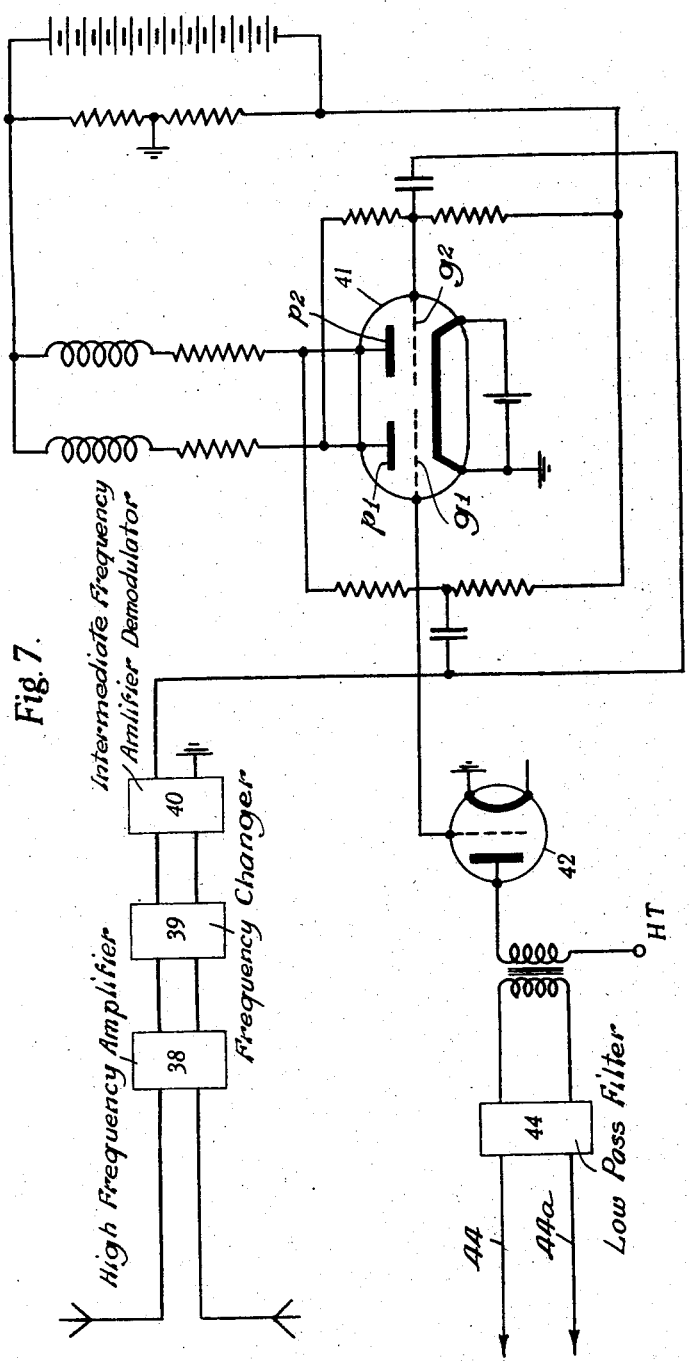
Fig. 7 represents an embodiment of a double pulse receiver system.

One form of double pulse receiver is shown Fig. 7. The tube 41 is any standard type of doubled triode tube, adapted to form a double-stability "trigger" circuit. Such a circuit has two stable positions of equilibrium:—(1) A position in which one of the grid voltages is approximately zero—(with a corresponding value of plate current);—while the opposite plate current is nearly zero. (2) A position in which the above conditions are reversed. When a negative pulse is applied to both grids G1 and G2, the circuit "triggers" over from whichever position it is in, to the opposite position.

38, 39 and 40 are respectively the normal high frequency amplifier, frequency changer, and intermediate frequency amplifier-demodulator of a superheterodyne ultra-short wave receiver.

The high frequency, intermediate frequency, and demodulator output circuits are designed to pass the band required by the transmitted pulses—i. e. about 200 kc. in the case of single-channel telephony. The gain of 40 is arranged to give an output pulse from the demodulator of about 20 volts from the received signal pulses,—during conditions of minimum field strength;—such an output is sufficient (with suitable values of the constants) to operate the "trigger" reliably.

The output of 41 is then passed through a decoupling tube 42 (to prevent reaction of the output load back on to the trigger)—and through a low pass filter (to cut out the pulse frequencies) to the line 44a.

The receiver (not shown) transforms the pulses received from line 44a into a reproduction of the original "signal" wave-form—as previously explained.

Figure 8:
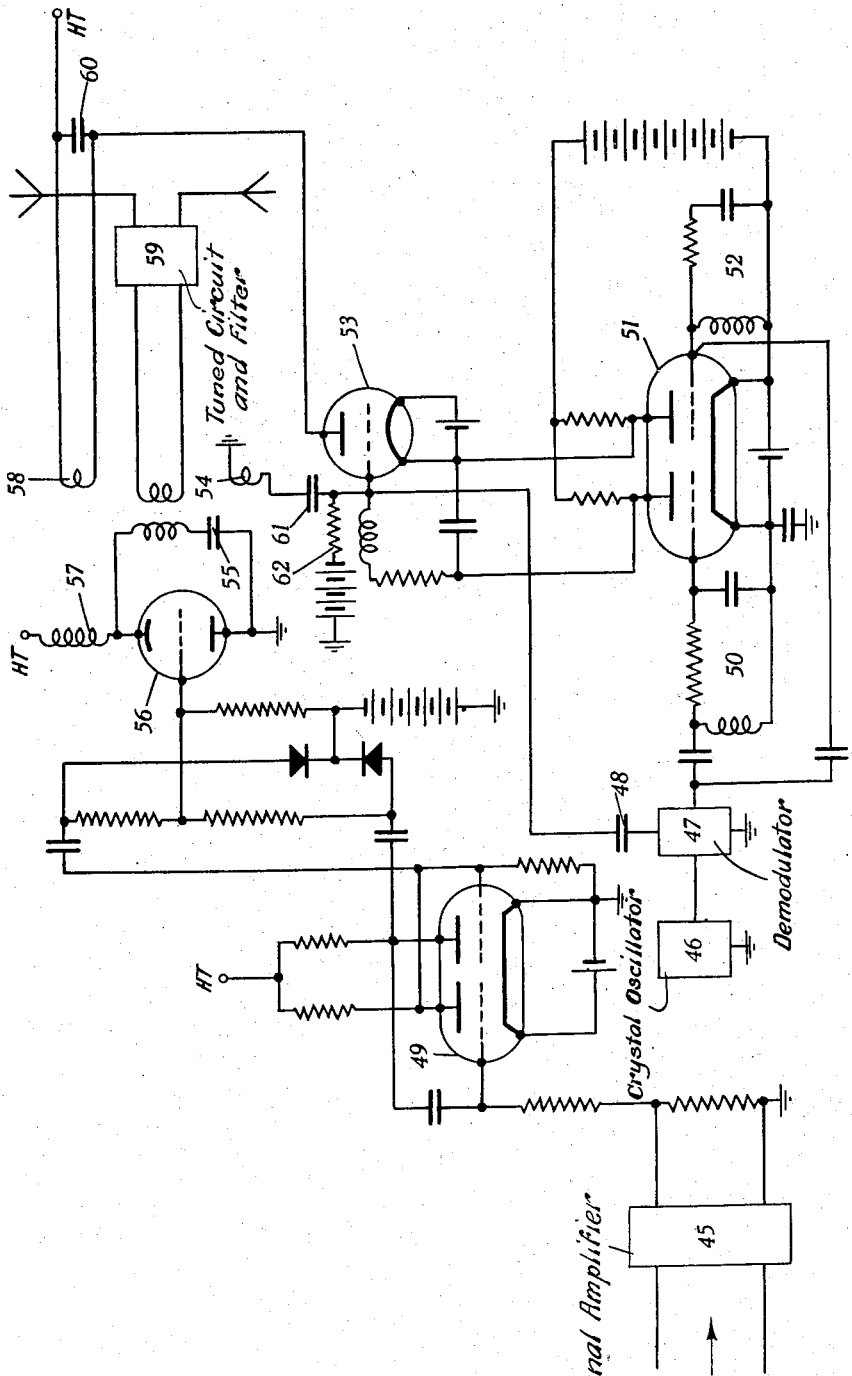
Fig. 8 shows an embodiment of a transmitter employing a grid-type gaseous discharge tube for generating the carrier by shock excitation, with means to stabilise frequency.

Fig. 8 illustrates one form of high power double-pulse transmitter for ultra-short waves. Output tube 56 is a grid-controlled mercury vapour tube, capable of giving a peak surge current corresponding to 100 kw. or more. (A small tube—comparatively speaking—will suffice for this purpose, as it is only the peak power that is high). The grid,—normally blocked by a bias voltage,—is unblocked by "double pulses" from the multi-vibrator 49—as already described in connection with Fig. 5. As the mercury tube is "trigged" by each pulse, a surge current will be caused by the discharge of condenser 55 through the tube. The circuit is designed so that when the surge has reached a certain value, the discharge ceases, owing to the fact that the choke 57 prevents condenser 55 from being replenished rapidly enough to maintain sufficient tube plate voltage. By the time that the surge has ceased, the originating pulse from 49 has also ceased,—hence the tube 56 will not discharge again until the arrival of the next pulse from the multi-vibrator.

The mercury tube surge circuit is coupled to the antenna through an oscillatory circuit tuned to the desired carrier frequency—e. g. 40 mc.—and a band-pass filter 59 designed to pass only the desired components of the pulse wave-form, —in general, those contained in a band of about 200 kc.

Tube 53 is of the high vacuum type;—it may be comparatively small,—capable of handling a peak power of only about 10% or less of the high frequency peak power in the antenna. The grid of 53 is coupled very loosely to the antenna output circuit by the coil 54—just enough high frequency being picked up to cause 53 to be half-fully loaded under normal conditions (i. e. when the carrier frequency is correct). On account of the capacity-resistance network 61—62, the drive on 53 is arranged to be approximately 90° out of phase with the voltage in the antenna circuit. The output of 53 is fed back into the main oscillatory circuit by means of the coil 58, tuned by condenser 60 to resonance; the voltage across 58 due to the plate current of 53 is thus 270° out of phase with the original electromotive force picked up by coil 54. The action of 54, therefore, on the main oscillatory circuit, will be to change the frequency of the wave train produced by the surge from 56 and not its amplitude—according to the amount of power fed back; it is, in fact, an electrical means of altering slightly the tuning of the main oscillatory circuit.

46 is a crystal oscillator unit (in general, a crystal oscillator from which the second harmonic is taken) which delivers oscillations at 40.5 mc. Output from 46, together with a small amount of the voltage in the antenna circuit (through condenser 48) is applied to the demodulator 47. The difference frequency (normally 500 kc.) is loosely coupled to the two bluntly tuned circuits 50 and 52—circuits tuned (at 500 kc.) to about 4 db. down from their resonance points, and on opposite sides of the latter. At exactly 500 kc., therefore,—i. e. when the transmitted carrier frequency is at the correct value of 40 mc.—equal plate currents will flow in the two sides of the double triode 51, thus causing no voltage difference between the two plates,—and therefore no change in bias on tube 53, as will be seen from the diagram. The connections are such, however, that if the transmitted frequency departs from 40 mc., the resulting difference in voltage between the two plates of 51 causes the output of 53 to rise or fall in such a manner as to tend to restore the original antenna frequency.

In the systems described so far the pulses used for "trigging" and "restoring" the receiver trigger circuit are of identical type. During perfect operation, this presents no disadvantage; if the receiver starts "in step" with the transmitter—the receiver trigger "marking" during the transmitter "marking" and "spacing" during the transmitter "spaces," this condition of correct locking will continue indefinitely. But if a pulse, at any time, is not received, or if an extra pulse is accidentally added by noise, the receiver will then continue giving "spaces" when it should be "marking"—and vice versa—until the next similar fault occurs. The above fault conditions will not be noticeable on telephony, since the only effect of a falling out of step is a reversal of the phase of the audio output, all the amplitudes and frequencies being the same as before. For certain purposes however, e. g. telegraphy, such a phase reversal would be inadmissible.

To prevent the possibility of such a fault—where it is of importance to do so—the "trigging" and "restoring" pulses must be of different type. One simple means of accomplishing this is by using a pulse of amplitude "a" for "trigging" and of "2a" for "restoring" or vice versa. In the trigger circuit of Fig. 7, the received pulses are applied to both of the two grids G1 and G2 of 41 in parallel, through two condensers. If a suitably biased oxide rectifier is added in series with the condenser connected to grid G2, the pulses of amplitude "a" will not pass this rectifier—only those of amplitude "2a"; while both pulses, of course, will arrive on grid G1. The pulses "a" on grid G1 only, can change the equilibrium position of the trigger in one direction only—viz. from "spacing" to "marking"; if such pulses arrive when the trigger is already "marking," they will have no effect. The pulses "2a," however, arriving on both grids, can change the trigger in either direction. Therefore, if a fault condition occurs and the trigger accidentally gets out of step, the correct "step" will automatically be restored on the arrival of the next "marking" pulse.

In the double pulse system as first described, a pulse is sent to delineate the times of the beginnings and the ends of the rectangular signals. In accordance with another of the features of the present invention one of each of these pairs of sharp pulses is omitted. The suppression of one of the impulses entails advantages which are explained later.

According to one method of accomplishing this feature of the invention, a local electromotive force is produced at the receiver in exact or approximate synchronism with the frequency of the oscillator producing the pulses at the transmitter. The latter local wave is then used to determine the moment of "start" or "finish" of the final rectangular signals produced by the receiver, and the received signals are used only to delineate the moments of "finish" or "start" respectively. If, for example, the local wave is used to locate the time of "finish," and the received signals the time of "start," then the time interval between each pair of "finishing" times will be equal (as the local oscillator has a steady, unmodulated wave-form). The time interval, however, between each adjacent "start" and "finish" will vary proportionally to the incoming audio voltage (in the case of speech or music, for example): therefore, after the frequency divider, or trigger circuit, has changed these pairs of sharp pulses into single, sustained "dashes," the length of these dashes will also be proportional to the incoming audio voltage, and hence the final audio output from the receiver, after filtering out the pulse frequencies. By this means, therefore, the number of pulses required to be transmitted per second, for a given result at the receiver, will be halved, thus making available—other things being equal,—twice the number of channels in a multiplex "distributor" system of the type previously described and also requiring half the average power consumption at the transmitter.

Figure 9:
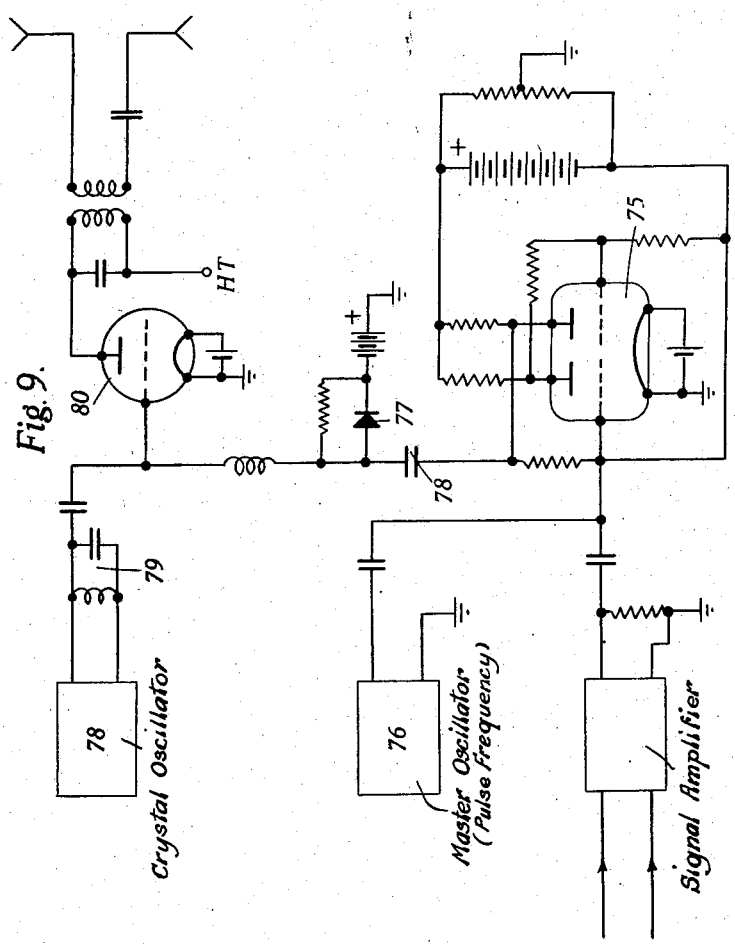
Fig. 9 shows another embodiment of a transmitter system.

The transmitter circuit is shown in Fig. 9. A free multi-vibrator as shown in Fig. 5 cannot be used to produce the pulse frequency, as with such a multi-vibrator it is practically impossible to avoid a slight modulation of the frequency of the pulses by the speech, as well as the desired modulation of their wave-form. In the circuit of Fig. 5, this frequency modulation is, in general, unimportant, but in the present instance, using a receiver circuit very sharply tuned to the received pulse frequency, it is not allowable. The difficulty can be overcome by using, instead of a multi-vibrator, a trigger circuit 75 of the form already described in Fig. 3, excited from a master oscillator 76 at the pulse frequency (assumed 15 kc.). With suitable values of the constants, the duration of the rectangular pulses of current in each plate circuit of 75 will be substantially proportional to the audio voltage impressed from the incoming speech—(as in the case of the multi-vibrator). These current pulses of variable duration are then transformed into sharp voltage pulses, corresponding to the beginning of each of the former, by means of the rectifier 77 and small condenser 78, exactly as in Fig. 5. The remainder of the circuit is again similar to that of Fig. 5—the final result being a modulation of a high frequency carrier at (say) 80 mc., by a series of sharp pulses located, in "time," at the moments of starting of the rectangular current pulses in 75—and the modulation taking place in such a manner that no high frequency is radiated except during these sharp pulses. The transmitter will then send out only one of each pair of sharp pulses, e. g. the "start" pulse.

Figure 10:
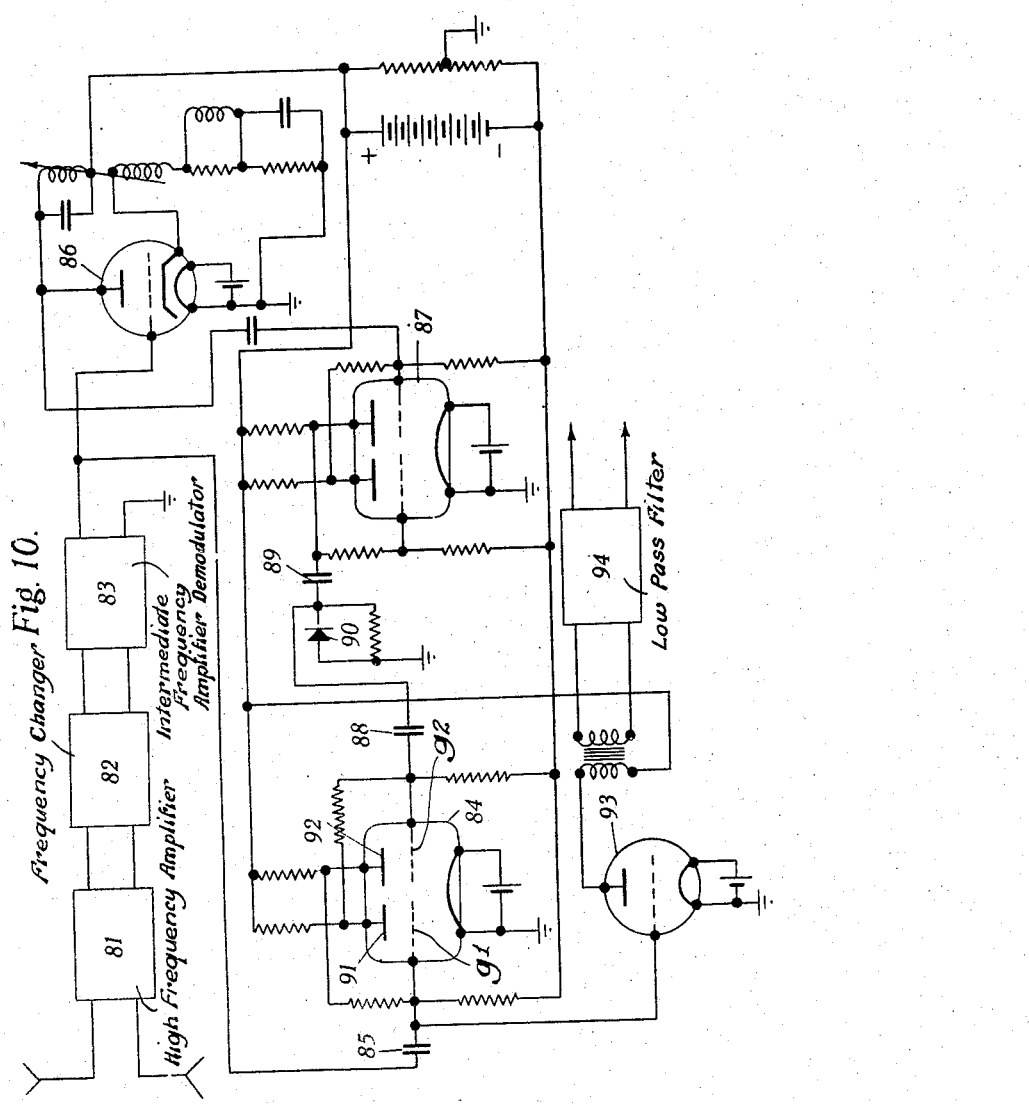
Figs. 10, 11 and 12 show respectively three other receiving systems embodying the invention.

A suitable form of receiver is shown in Fig. 10. As in Fig. 7, the receiver shown is of the super- heterodyne type, 81, 82 and 83 being the high frequency amplifier, frequency changer, and intermediate frequency amplifier-demodulator respectively. The received sharp pulses corresponding to the starts of the rectangular dashes are applied to the trigger circuit 84 of the same form as that shown in Fig. 3 through coupling condenser 85. The output pulses from 83 are also applied to the "balanced reaction" circuit 86. This latter circuit, has the property of enabling very sharply selective circuits to be obtained without introducing the instability usually associated with the use of reaction; by using such a circuit, tuned to the pulse frequency, and having a band width appreciably less than sufficient to pass the lowest components of the audio signal, a pure sinusoidal output is obtained at the frequency of the received pulses. The latter output is then applied to the trigger circuit 87, in such a manner as to produce at the output of 87 a substantially rectangular wave-form at the frequency of the received pulses, but of constant duration. These steady pulses from 87 are then applied to grid 92′ of the trigger tube 84 through coupling condenser 88—after being transformed into uni-directional sharp pulses, having a constant time interval between them—once every cycle of the received pulses,—by means of the small coupling condenser 89, and the metal rectifier 90. The action of 89 and 90 is exactly similar to that of 23, 25 respectively in Fig. 5.

Current in the circuit of plate 92 of trigger tube 84 will now be started by the arrival of the negative pulses of variable phase directly from the output of 83 and this current will continue for a fraction of a pulse cycle, until the arrival of the restoring pulse, of constant phase, from 87. The constants of the circuits (including the exact phase of the sinusoidal input to 87 are so adjusted that with zero momentary modulation of the transmitter by the audio signal, rectangular pulses are obtained from the plate circuits (and grid circuits), of 84 preferably having substantially equal "marking" and "spacing" durations. These durations will, then, be modulated linearly with respect to the momentary amplitude of the incoming audio signal at the transmitter; and a substantially exact replica of this original signal wave will be obtained at the output of the low-pass filter 94—as already explained in connection with Fig. 7.

With the circuit of Fig. 10, it is clear that "positive locking" in step with the pulses at the transmitter occurs automatically—and that in cases, therefore, where occasional phase reversals of the output wave-form are not allowable, no extra devices such as those already described, are required.

The above circuits are by no means the only ways of carrying out the invention and a number of alternative methods are obvious. Instead of the use of "balanced reaction," for example, a free oscillator could be used locked into step with the transmitter pulse oscillator by the application of a little of the output of 83.

The devices so far described have the property of greatly increasing the signal/noise ratio under conditions such that the noise peak voltage is always less than the peak values of the received pulses. This is the normal condition, very easily achieved, in the case of ultra-short wave links having the receiving stations in quiet locations (away from main roads etc.); in such links, the chief noise background, on wavelengths shorter than about 8 meters, is almost always due to the receiver tubes themselves giving a steady "hiss"; it contains no components having high peak values. But it would often be desirable, on economic grounds, to locate the receiver in or near a town, where much interference of "peaky" wave-form, due to automobiles, etc., normally exists; if this could be done without appreciable deterioration of circuit performance.

"Pulse modulation" according to the invention provides a method of carrying out this objective in a manner that is impossible when using normal amplitude modulation. For example, in the case of substantial absence of fading (as on ultra short wave links having optical visibility), the receiver gain can be adjusted so that the received signal pulses after amplification have always a peak voltage of between (say) 6 volts and 7 volts; and the circuit designed so that noise peaks will not affect the trigger unless these latter peaks also lie approximately between these two voltage values, a condition that will obviously not occur frequently.

Figure 11:
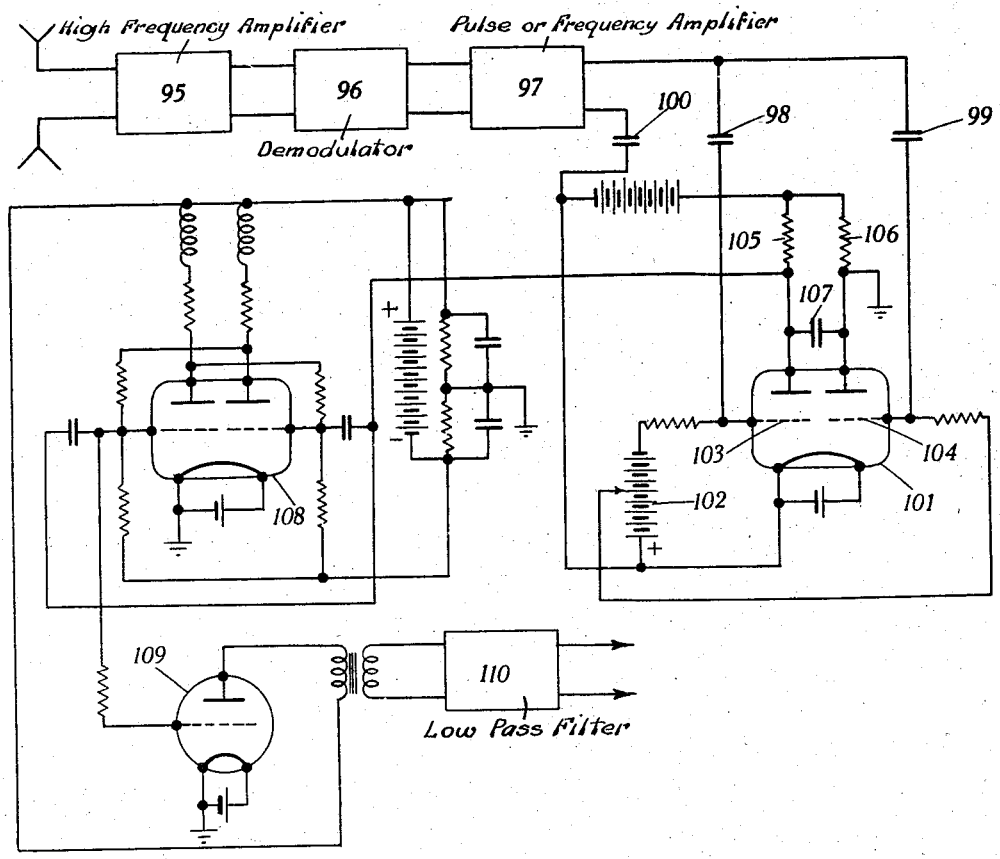

One method of achieving this object is illustrated in Fig. 11 in which a "straight" amplifier, as opposed to a superheterodyne, is shown, to indicate another of the various possibilities. The output of high frequency amplifier 95 after demodulation to the pulse frequency by 96 is amplified by the pulse frequency amplifier 97—which latter is designed to have a time-constant short enough to avoid appreciably distorting the wave-form of the pulses as received. The output of 97 is applied through coupling condensers 98, 99 and 100 between the two grids 103, 104 and the filament of the double triode 101, which has an uncoated tungsten filament to enable current saturation to be easily achieved. By means of the battery 102, having a tapping, a grid bias of (7+v) volts is applied (through an appropriate grid leak) to grid 103, and a bias of (5+v) volts applied similarly to the grid 104, where "v" is the voltage required by the tube 101 to produce current "cut-off." A pulse now arriving on the grids of 101 will now cause no current to flow in either plate circuit unless a peak value of at least 5 volts is reached. Between 5 volts and 7 volts plate current will flow in resistance 105 only; and with values of peak voltage exceeding 7 volts current will flow in both 105 and 106. The filament emission of 101 is reduced to such a value that a grid voltage only slightly in excess of that required to overcome the cut-off bias is sufficient to cause plate current saturation, (e. g. 6 volts and 8 volts, respectively, on the two grids). With a peak voltage on the two grids in excess of 8 volts, therefore, substantially equal currents will flow in 105 and 106, so that the difference voltage between the two plates of tube 101 will be nearly zero. With such a pulse having a peak value in excess of 8 volts, if the plate currents of 101 followed instantaneously the changes in the grid volts, the result, clearly, will be:

(1) A sharp rise of current (to eventual saturation) as soon as the grid volts on 103 has risen above 5 volts; and (2) A subsequent sharp rise of current in 106 as soon as the grid volts on 104 has risen to above 7 volts—and again to eventual saturation at 8 volts and over. In this case, therefore, the difference voltage between the two plates will rise very sharply from zero, and then again fall to zero as soon as the peak volts applied to the two grids had risen to 8 volts and above, as in the latter condition the plate currents are substantially equal. In the case of all pulses of the normal simple wave-form (a single sharp rise, with a sharp fall), and excluding those having a peak only very slightly in excess of the critical value of 7 volts—the duration of the above initial rise of current in resistance 105 up till the instant when the corresponding current in 106 neutralises it, will be small compared with the total duration time of the pulse, (and this ratio; other things being equal, will be larger the higher the pulse peak value). If, therefore, the small condenser 107 is connected between the two plates of 101 having a value, in conjunction with the resistances 105 and 106, sufficient to distort the wave-form of the "total" desired pulses (as received) only slightly, its effect on the much shorter initial rise of current in 105 will be to smooth out this "spurious" pulse almost entirely, reducing it to a negligible peak amplitude.

The overall result, therefore, after the introduction of 107, will be that only pulses having peak values between about 5 volts and 8 volts can cause any appreciable peak output pulses of "difference" voltage between the two plates of tube 101, input peak values of less than 5 volts are insufficient to overcome the cut-off bias—and peaks in excess of 8 volts will cause the two plate circuits to neutralise each other.

As shown in Fig. 11, the above difference voltage is applied between the input of the trigger circuit 108 (of the "frequency divider" type, as illustrated in Fig. 7) and ground. The desired pulses, of peak values between 6 volts and 7 volts, will therefore be fully effective in operating this trigger; but unwanted noise pulses can only cause spurious operation in the infrequent circumstance of their peak values lying between about 5 volts and 8 volts. Noise can, of course, render the receiver insensitive to the desired signal pulses during the duration of the noise, although it may not operate the trigger itself; but in the type of noise now dealt with, the duration time is normally too short for this objection to be serious.

As in Fig. 7, the output of the trigger 108, obtained from one of its grids, is fed into the low frequency amplifier 109, followed by low-pass filter 110, at the output of which the correct speech (or other signal) wave-form is obtained.

Figure 12:
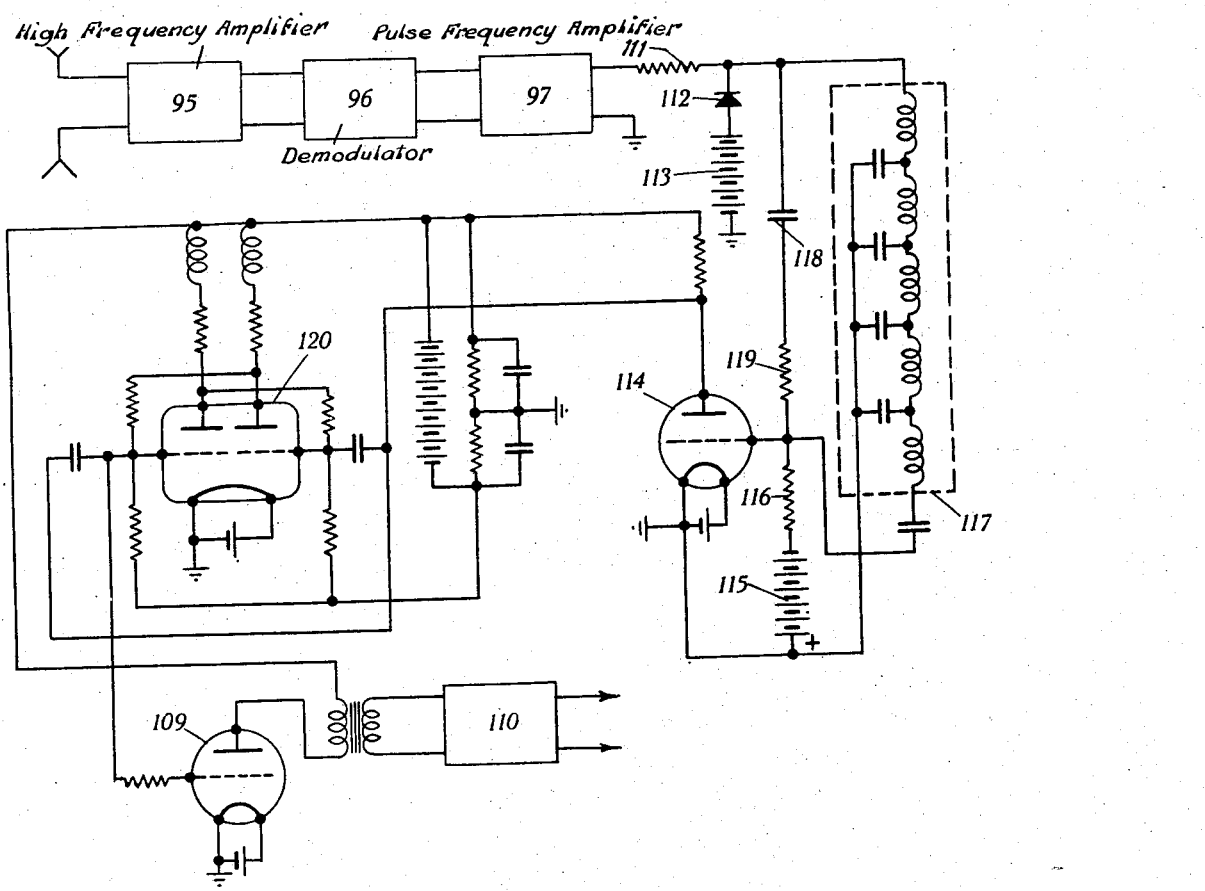

Another of the many possible ways of using a definite characteristic of the desired pulses different, in general, from any characteristic possessed by interference, is to employ a certain property of the transmitted pulses that is already inherent in the system, instead of introducing some extra feature. In the double pulse system, for example, the time interval between one pair of "trigging" or "restoring" pulses, and the adjacent pair, can only vary by a small maximum amount, depending on the highest audio frequency passed, a property that is not possessed by random noise pulses. Fig. 12 shows one way of using this property to eliminate most of the remaining noise, noise that has a peak value equal to, or higher than, the desired signal pulses.

The units 95, 96 and 97 have the same functions as in Fig. 11. The output of 97 is applied to resistance 111, and shunted to ground through the metal rectifier 112. 112 is biassed by battery 113 in such a manner that positive pulses appreciably higher in amplitude than the signal pulses have their peaks cut off, thus limiting their peak values to a figure only slightly in excess of that of the desired signals. After this limiting device, part of the remaining pulse output is applied to the grid of the triode 114 (biassed past cut-off by battery 115, through grid leak 116). An equal portion of the pulse output from 97 is passed through the delay circuit 117. The latter, as shown in Fig. 12 in the dotted enclosure, is a simple inductance-capacity T network, but this delay circuit may be of any form whatever, including, if desired, a mechanico-acoustic device. The circuit 117 is of such a design that a delay is introduced equal to the time interval between alternate signal pulses, when the transmitter is unmodulated, and without appreciably distorting the pulse wave-form (i. e. the phase displacement introduced must be proportional to frequency).

In the direct path to the grid of 114 through condenser 118 sufficient attenuation is introduced by the action of the two resistances 116 and 117 to compensate for the loss in the delay circuit, so that the pulses arrive on the grid with approximately equal amplitudes by both paths.

114 is biassed so that a pulse arriving by one path only is insufficient to cause plate current to flow; but the bias is such that on the simultaneous arrival of the pulse by both paths, a pulse of plate current occurs in 114, and hence the operation of the double-stability trigger 120.

When, therefore, the first "trigging" or "restoring" signal pulse arrives at the receiver, nothing passes through tube 114, but the reception of the second pulse of the same nature is approximately coincident with the arrival of the first pulse on the grid of 114 by means of the path through the delay circuit 117.

Hence the second signal pulse ("trigging" or "restoring") will operate the trigger 120, and similarly all subsequent pulses, as every pulse except the first has been immediately preceded by a similar pulse at the correct time interval to give this coincidence on the grid of 114. Random noise pulses, however, will only infrequently have this property; they will, therefore in general be unable to operate the trigger, and hence will not affect the final speech output.

Of course, owing to the modulation at the transmitter by the incoming speech, the time interval between each adjacent pair of "trigging" or "restoring" pulses will not be exactly equal. Either the duration of the pulses as transmitted, or their duration as received on the grid of 114, is adjusted so that, with the maximum possible difference in this time interval due to modulation, there is still sufficient overlap in the duration times of the pulses arriving on the grid of 114 to cause an operating pulse on the trigger 120.

It is obvious that the scope of the invention is not limited to the specific embodiments described, and that the invention may be employed in arrangements other than those given by way of example.

What is claimed is:

1. For use in a signaling system of the type wherein the time positions of short pulses of carrier waves represent the respective momentary values of the signal, a transmitter comprising timing means for controlling the timing of the desired pulses, means controlled by said timing means for producing sharp electrical surges, a resonant circuit connected to be shock excited by said surges to produce short damped trains of carrier waves responsive to such surges, and means for transmitting such damped trains of carrier waves.

2. A transmitter comprising a source of communication signals, timing means controlled by such communication signals for producing timing signals whose timing represents the momentary values of said communication signals, a gaseous discharge tube connected to produce abrupt current surges responsive to said timing signals, an electrically resonant circuit connected to be shock excited by each such surge to produce a short damped train of high frequency carrier waves responsive to each such surge, and means for transmitting such damped trains of carrier waves.

3. A transmitter according to claim 2, further comprising means for stabilizing the frequency of said damped trains of carrier waves.

4. A transmitter comprising a source of communication signals, timing means controlled by such communication signals for producing timing signals whose timing represents the momentary values of said communication signals, a gaseous discharge tube connected to produce abrupt current surges responsive to said timing signals, an electrically resonant circuit connected to be shock excited by each such surge to produce a short damped train of high frequency carrier waves responsive to each such surge, means for transmitting such damped trains of carrier waves, means for determining the deviation of the frequency of said damped trains from a desired value, a governing discharge tube device controlled by said deviation determining means for variably governing the flow of carrier frequency waves, and connections for transferring carrier frequency waves between said device and said resonant circuit substantially throughout the duration of each transmitted damped train of carrier waves.

5. A transmitter according to claim 4, wherein said deviation determining means comprise a low power piezo-electric-crystal controlled source of oscillations, and means for comparing the frequency of such oscillations against the frequency of said damped trains of carrier waves.

6. A transmitter according to claim 4, wherein said governing discharge tube device is a low power high-vacuum tube amplifier having an input and an output, and wherein said connections for transferring waves between said resonant circuit and said device comprise means for transferring waves from said resonant circuit to the input of said amplifier, and means for transferring waves from the output of said amplifier to said resonant circuit out of phase with the waves in said resonant circuit.

ALEC HARLEY REEVES.